No. 694,891. Patented Mar. 4, 1902.
F. RAUH.
CLOTHES LINE FASTENER.
(Application filed Sept. 14, 1901.)
(No Model.)
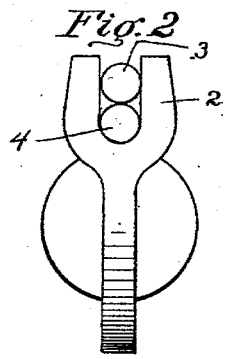
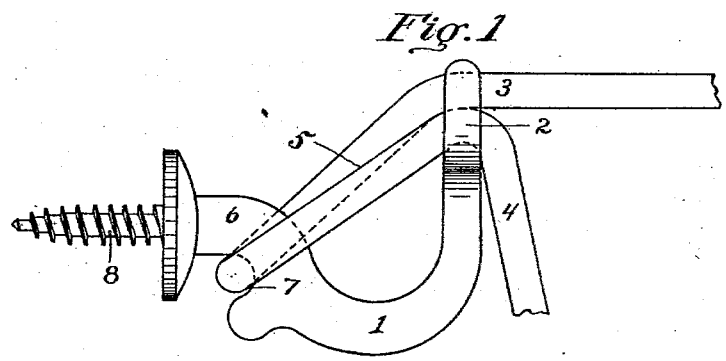
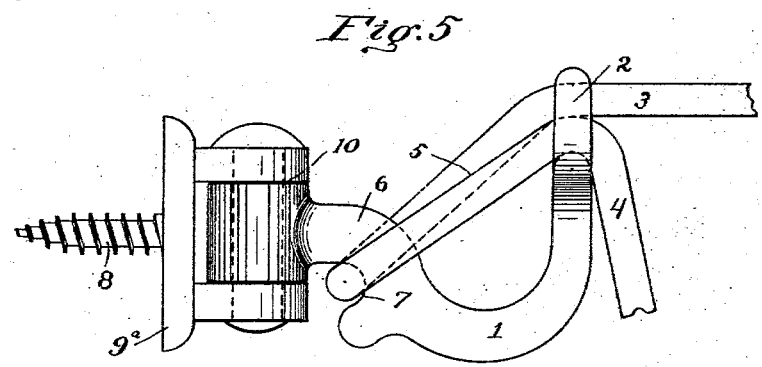
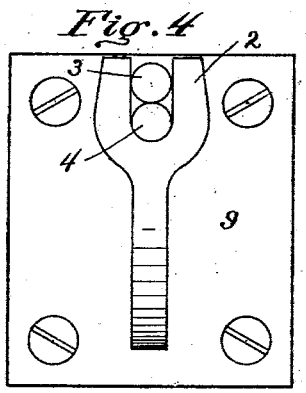
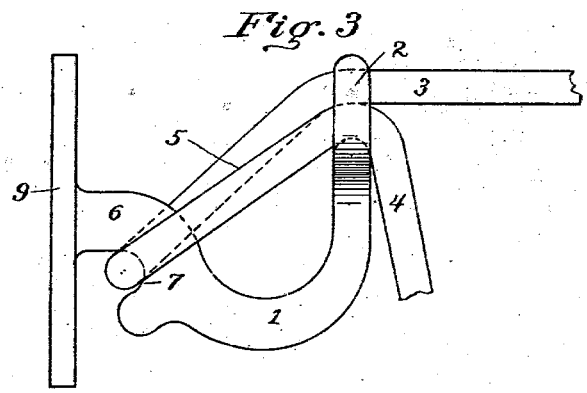
Witnesses.
Fred D. Sweet.
Inventor.
Fredericke Rauh
By Kay & Totten
Attorneys.

UNITED STATES PATENT OFFICE.

FREDERICK RAUH, OF ELLIOTT, PENNSYLVANIA.

CLOTHES-LINE FASTENER.

SPECIFICATION forming part of Letters Patent No. 694,891, dated March 4, 1902.

Application filed September 14, 1901. Serial No. 75,416. (No model.)

*To all whom it may concern:*

Be it known that I, FREDERICK RAUH, a resident of Elliott borough, in the county of Allegheny and State of Pennsylvania, have invented a new and useful Improvement in Clothes-Line Fasteners; and I do hereby declare the following to be a full, clear, and exact description thereof.

My invention relates to fastening devices for clothes-lines and other ropes; and its object is to provide a device of this kind which is simple and cheap to manufacture, to which the clothes-line or other rope can be quickly and easily secured and detached, and which will firmly and securely hold the line or rope without danger of slipping or becoming unfastened.

In the accompanying drawings, Figure 1 is a side view of my improved fastening device. Fig. 2 is a front view of the same. Figs. 3 and 4 are side and front views, respectively, of the same with a modified form of base; and Fig. 5 is a side view showing the device hinged to the base.

The device comprises any suitable support adapted to receive both strands of the line or rope and to hold them in such position that one will lie upon the other, together with suitable means to the rear and below the level of the support around which the loop or bight of the line or rope is passed, so that said loop or bight is inclined in a downwardly direction, thereby clamping the free end of the line or rope firmly against the support by the tension on the other strand of the rope or line which lies thereon. This device may be given various forms and shapes; but I prefer to form it essentially as shown in the drawings, in which it has the shape of a hook 1, said hook having at its outer end the support for receiving the two strands of the line or rope, said support being shown as a fork 2 of a width substantially equal to the thickness of the rope, so that it will hold the line or rope 3 on top of the free end 4 thereof. The bight or loop 5 of the line or rope is inclined downwardly and to the rear of the fork or support 2 and is held in this position by any suitable means—such, for instance, as by being passed around the shank 6 of the hook, on which it is held from slipping by the notch 7 or by a lug on the shank of the hook around which the loop 5 is passed. In any event the free end 4 of the line will lie in the fork 2, the loop or bight 5 will be inclined downwardly, as shown, and the rope or line proper, 3, will be held on top of the free end 4, so that the tension or pull on the rope or line 3 will bind the free end firmly in the fork and prevent the same from slipping. The free end 4 is held not only by the friction against the fork, but also by the friction between said end and the line 3. Since any slipping of the line would cause these strands to move in opposite directions on each other, the greater the tension or strain on the line 3 the more firmly will the free end 4 be clamped in place, so that it is impossible to cause the rope or line to slip or become unfastened.

The hook 1 may be provided with any suitable means for securing it to a post or building, preferably with a screw 8, although, if desired, a plate 9, as shown in Figs. 3 and 4, may be employed, said plate being adapted to be secured to the post or building by means of suitable screws, as will be apparent.

In some cases it may be desirable to hinge the hook 1 to the base 9ª—as shown, for instance, in Fig. 5—the hinge being an ordinary one and is shown at 10. This will enable the line or rope 3 to be stretched in any direction from the post or building to which the fastener is secured.

To secure a clothes-line in place, it is merely necessary in securing the first end of the line to bring the free end 4 thereof through the fork 2 and then pass the line around the shank 6 in the notch 7 and bring it back through the fork 2, thus forming the bight 5 and having the line 3 lying on top of the free end 4. Any amount of strain can then be put upon the line. When this end of the line has been secured, the other end is passed around the shank of another hook, through the notch 7 thereon, and then by pulling on the free end the line can be stretched as tight as necessary. When fully stretched, the free end is carried up into the fork 2, but without slacking the same. Then the line 3 is lifted and laid upon the free end in the hook. This will bind the free end and keep the same from slipping, and at the same time the line will be perfectly tight. The notch 7, it will be observed, is practically a hook opening to the rear and provides a convenient and effective support around which the line can be stretched.

As above stated, the particular form or shape of the device is not essential; neither is it essential that the parts be located in the relative position shown, as the device might be turned upside down or at right angles without affecting the principle thereof, and the use of the words "to the rear of" and "below" in the claims is intended merely to define the relative positions of the parts and not to specify their absolute positions.

What I claim as my invention, and desire to secure by Letters Patent, is—

1. A clothes-line fastener comprising a suitable support adapted to receive both strands of the rope and hold one on top of the other, and a notch or hook below the level of said support and a considerable distance to the rear thereof for holding the loop or bight inclined downwardly, whereby one strand will lie on top of the other and substantially parallel thereto and bind the same against the support.

2. A clothes-line fastener comprising a fork of a width substantially equal to the thickness of the rope and adapted to receive both strands thereof and hold one strand on top of the other, and suitable means below the level of said fork and a considerable distance to the rear thereof for holding the loop or bight of the rope inclined downwardly, whereby one strand will lie on the other and substantially parallel thereto and bind the same against the support.

3. A clothes-line or other rope fastener comprising a hook having a fork of a width substantially equal to the thickness of the rope and adapted to receive both strands of the rope and hold one on top of the other, and having a notch formed in its shank below the level of the fork and a considerable distance to the rear thereof for holding the loop or bight of the rope inclined downwardly, whereby one strand of the rope will lie on top of the other and substantially parallel thereto and bind the same against the support.

4. A clothes-line or other rope fastener comprising a suitable support adapted to receive both strands of the rope and hold one on top of the other, a hook or notch below the level of said support and a considerable distance to the rear thereof for holding the loop or bight inclined downwardly, whereby one strand will lie on top of the other and substantially parrallel thereto and bind the same against the support, and a base to which said fastener is hinged.

In testimony whereof I, the said FREDERICK RAUH, have hereunto set my hand.

FREDERICK RAUH.

Witnesses:
F. W. WINTER,
ROBERT C. TOTTEN.